(No Model.)
G. CURRY.
AUTOMATIC FEATHERING FLOAT FOR PADDLE WHEELS.
No. 583,171. Patented May 25, 1897.
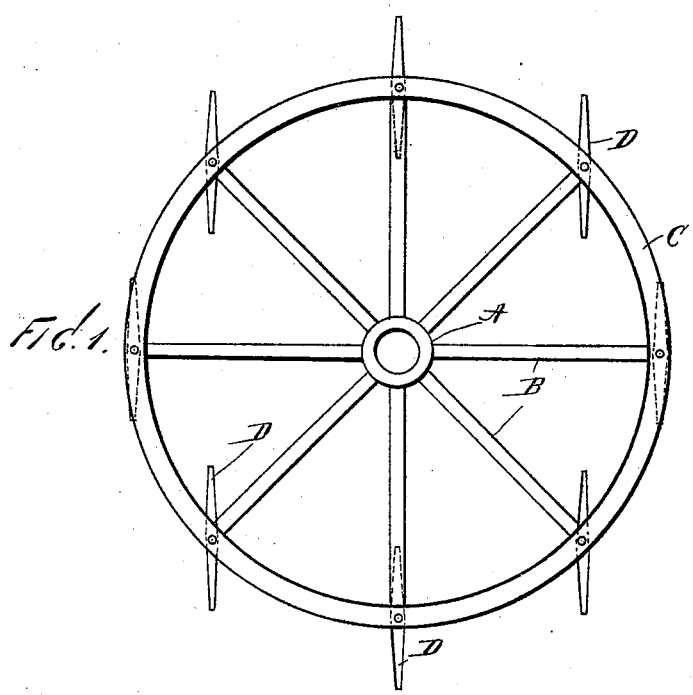
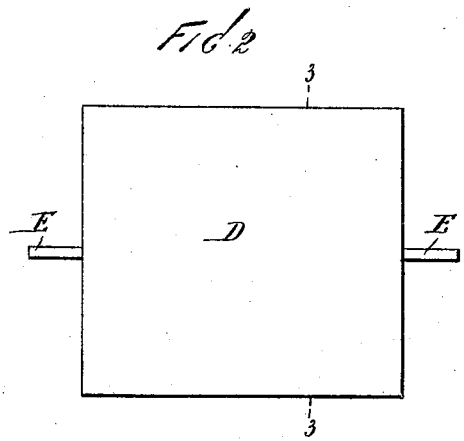
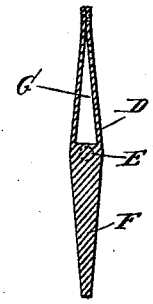
WITNESSES
INVENTOR
George Curry,
BY
Edgar Tate & Co
ATTORNEYS.

UNITED STATES PATENT OFFICE.

GEORGE CURRY, OF TEXAS CREEK, COLORADO.

AUTOMATIC FEATHERING-FLOAT FOR PADDLE-WHEELS.

SPECIFICATION forming part of Letters Patent No. 583,171, dated May 25, 1897.

Application filed November 14, 1896. Serial No. 612,107. (No model.)

*To all whom it may concern:*

Be it known that I, GEORGE CURRY, a citizen of the United States, residing at Texas Creek, in the county of Fremont and State of Colorado, have invented certain new and useful Improvements in Water-Power Apparatuses, of which the following is a full and complete specification, such as will enable those skilled in the art to which it appertains to make and use the same.

This invention relates to water-wheels and other power apparatus of this class; and the object thereof is to provide an improved swiveled feathering paddle or blade for said apparatus; and the invention is fully disclosed in the following specification, of which the accompanying drawings form a part, in which—

Figure 1 is a side view of a water-wheel provided with my improvement; Fig. 2, a side view of one of the paddles or blades detached, and Fig. 3 a cross-section thereof on the line 3 3.

In the drawings forming part of this specification the separate parts of my improvement are indicated by the same letters of reference throughout the several views, and in practice thereof, as shown in the drawings, I provide a water-wheel which comprises a hub A, spokes B, and a rim C, and it will be understood that two sets of the spokes B and two of the rims C are provided. I also provide a paddle or blade D, which is of the form shown, Figs. 2 and 3, and which is provided centrally of each end with projecting tenons E, and said tenons are passed through suitable bearings formed in the rims C.

The paddles or blades D, any desired number of which may be employed, are preferably composed of metal, and one side thereof is formed solid, as shown at F in Fig. 3, and the other is hollow, as shown at G in said figure, the object of this construction being to provide means whereby the paddles or blades will always be held in a vertical position, it being understood that the paddles or blades are free to swing on the tenons E, by means of which they are connected with the rims C of the wheel.

My invention is not limited to the material of which the paddles or blades R are made, nor to the exact form and construction thereof, the only object in this connection being to so weight one side thereof that the said paddles or blades will always hang in a vertical position, as described, and as shown in Fig. 1.

My invention is particularly applicable for use in connection with vessels which are propelled by wheels; and Having fully described my invention, I claim as new and desire to secure by Letters Patent—

A water-wheel having a hub, a double set of spokes and rims mounted thereon, paddles or blades mounted between said rims, projecting tenons on said blades intersecting suitable bearings formed in said rims, said blades having one side thereof formed solid and the remaining side of a hollow form, said parts being combined substantially as described.

In testimony that I claim the foregoing as my invention I have signed my name, in presence of the subscribing witnesses, this 7th day of November, 1896.

GEORGE CURRY.

Witnesses:
EUGENE BEUCHAT,
CHARLES WILLIAM PETERSEN.